Feb. 3, 1970

R. E. DIETZ ET AL 3,493,890

PHONON-TERMINATED LASER

Filed July 28, 1965

INVENTORS R. E. DIETZ
H. J. GUGGENHEIM
L. F. JOHNSON

BY *Wilford L. Wisner*

ATTORNEY

3,493,890
PHONON-TERMINATED LASER

Robert E. Dietz, Morristown, Howard J. Guggenheim, Somerville, and Leo F. Johnson, Bedminster, N.J., assignors to Bell Telephone Laboratories, Incorporated, New York, N.Y., a corporation of New York
Filed July 28, 1965, Ser. No. 475,351
Int. Cl. H01s 3/16; C09k 1/04
U.S. Cl. 331—94.5        14 Claims

ABSTRACT OF THE DISCLOSURE

This application describes a phonon-terminated laser capable of being continuously tuned over a wide tuning range. It is disclosed that the tuning discontinuities normally found in phonon-terminated lasers can be eliminated by including in the active medium lasing ions of one transition element and nonlasing ions of a different transition element. The nonlasing transition element is introduced in sufficient concentration to perturb the upper and lower lasing levels of the lasing transition element. This perturbing effect smooths the phonon spectrum of the lasing transition element which enables continuous tuning of the laser.

---

Figure 1:
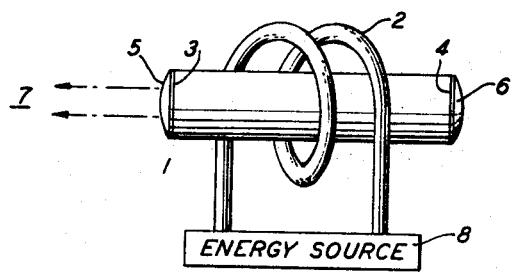

This invention relates to optical masers employing phonon-terminated emission lines of appropriate active media. Optical masers of this type may be employed as tunable oscillators or as broadband optical amplifiers.

Recent developments in the optical maser or laser art have indicated that the stimulated emission of radiation that is coherent is not necessarily limited to the narrow discrete frequency bands characteristic of the early devices. For example, in our copending application, Ser. No. 333,266, filed Dec. 20, 1963, as a continuation-in-part of our application, Ser. No. 302,108 (now abandoned), filed Aug. 14, 1963, both assigned to the assignee hereof, we disclose the discovery that stimulated emission of coherent radiation with broadband tunability can be obtained from paramagnetic ions in the lattice of a suitable host compound such as a divalent metal fluoride.

In the aforesaid copending application we disclose that a population inversion can be obtained for a selected energy state transition in a paramagnetic ion selected such that the total amount of energy released in a stimulated process is split between a photon of stimulated radiation and a phonon, or lattice vibration, that can absorb any available energy within a substantial range of energies. Consequently, the energy of the stimulated radiation is determined not only by the electronic state transition and minor broadening effects, but also by tuning to the extent permitted by the range of phonon energies. In this case, the laser is said to be phonon-terminated.

The present invention is directed to improved forms of phonon-terminated lasers and in particular to forms of widened tuning range and of increased efficiency with lower lasing thresholds.

A feature of our invention is a laser active medium including lasing ions of one transition element, such as $Ni^{2+}$, and non-lasing ions of a different transition element such as $Mn^{2+}$, which is present in a sufficient concentration to perturb the upper and lower lasing levels of the first transition element in order to widen and smooth the tuning range.

We have found that the aforementioned combination of manganese and nickel ions also increases the efficiency and lowers the threshold of the laser according to energy transfer relationships that are also applicable to other combinations of the transition elements. Typically, the energy-transferring ion, or non-lasing ion, has a greater concentration than the active ion, and its compound provides a new type of laser host. As specific examples, the host compound may comprise $MnF_2$ or $KMnF_3$. In such a crystal, $NiF_2$ or $KNiF_3$, respectively, shares the same crystalline latice with the hose compound to provide the active $Ni^{2+}$ ions.

In those cases in which energy transfer from the non-lasing ion to the lasing ion is desired, the lasing and non-lasing transition element ions are selected so that essentially all the excited energy levels of the non-lasing ion are substantially above the upper lasing level of the lasing ion. The energy transfer apparently occurs through a resonant process in which the different neighboring paramagnetic ions interact directly or in which intervening atoms of the lattice act as a bridge.

In those cases in which only the broadening and smoothing of the tuning range is desired, the non-lasing ion can be any transition element selected from the group consisting of titanium, vanadium, chromium, manganese, iron, cobalt, nickel and copper, inasmuch as all of these can provide an exchange interaction with the lasing ion to perturb its energy levels.

The preferred lasing ions are divalent nickel or cobalt, or trivalent chromium, which is preferably charge compensated with a monovalent ion such as lithium; but it appears that the other transition element ions should be usable as lasing ions. The beneficial energy transfer and the elimination of tuning discontinuities can be achieved with both rutile-type and perovskite-type forms of the host. A particular advantageous perovskite-type laser material is $KMnF_3:Ni^{2+}$, where $KMnF_3$ is the perovskite-type host compound and $KNiF_3$ mixed therein provides the active $Ni^{2+}$ ions. This particular laser material advantageously provides a tuning band substantially removed from the 1.9$\mu$ water vapor absorption band. Other crystalline forms of the host compound may include those in which sodium, cesium or rubidium ions are substituted for potassium ions.

Moreover, it would appear that the principles of the invention are applicable broadly to still other forms of hosts for the different transition ions, such as glasses.

Figure 2:
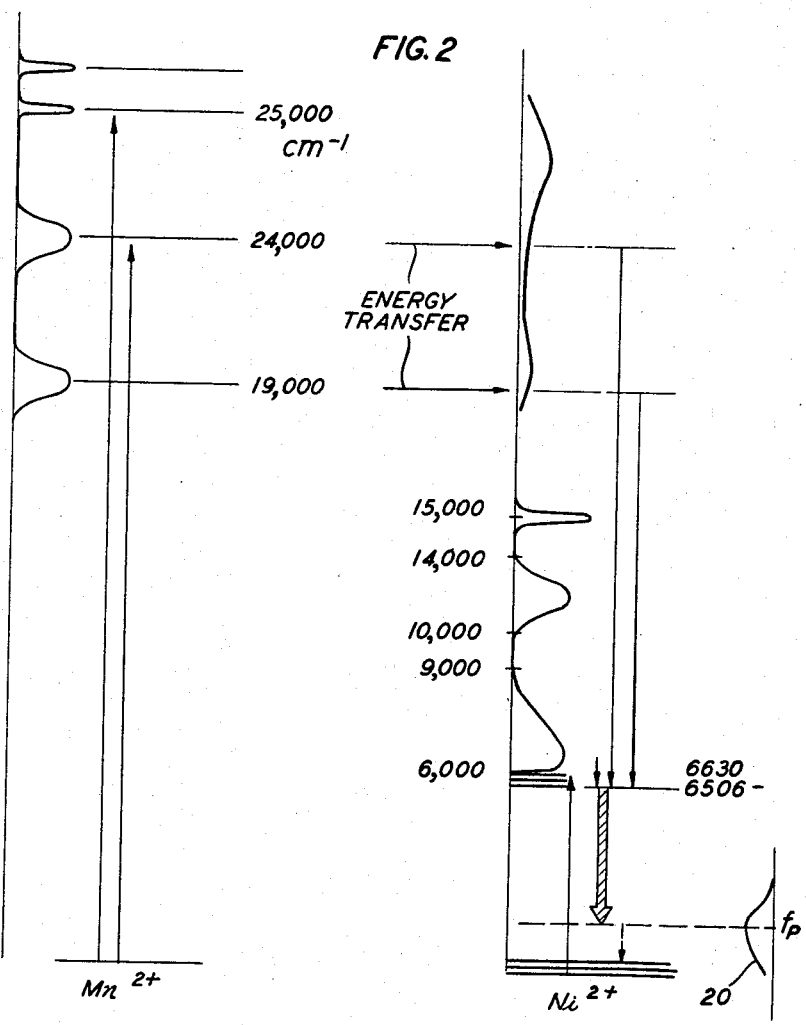

Our invention may be more fully apprehended from the following detailed description in conjunction with the drawing in which:

FIG. 1 is a pictorial illustration of a preferred embodiment of the invention; and FIG. 2 shows curves that are helpful in understanding the theory and operation of the invention.

The following general information concerning characteristics common to this invention and the invention of our above-cited copending application may be helpful as background for the description that follows.

The fluorescent spectra of the materials of both inventions do include sharp "no-phonon" or "pure electronic" emissions lines of the type familiar in the laser art. Nevertheless, their spectra also include broadband vibrational structure adjacent to the no-phonon lines. The vibrational structure results from electronic transtions which are accompanied by the simultaneous emission (or possibly at high temperatures, absorption) of one or more phonons within the crystalline host lattice. Lasers employing such materials may operate at any wavelength within the combined phonon, no-phonon emission structure at which the gain exceeds a threshold level.

A particular wavelength within the broadband emission structure may be selected by any of the many known techniques of optical tuning or frequency selection. For example, in an oscillator the reflectors defining the ends of an optical cavity may be designed to have a peak reflectivity at the desired wavelength. Alternatively a dispersive element, such as a prism, or an electronically controllable dispersive element, may be included within the optical cavity and such element arranged to cause all light waves of wavelengths other than the desired one to leave the cavity after, at most, a few traversals of the active medium. Moreover, this element selectively directs the rays of the desired wavelength to be reflected back and forth many times to be intensified by prolonged interaction with the medium.

On the other hand, by avoiding such frequency selective techniques, as amplifier employing an active medium as disclosed herein is capable of nonselectively amplifying signals over a broad band of the optical spectrum and would therefore be useful in proposed broadband optical communication systems.

A laser employing the principles of the invention is shown in FIG. 1. There is depicted as the active medium a rod-shaped crystal 1 having appropriate coscentrations of the different transition element ions as disclosed herein. Pump energy is supplied by a helical lamp 2 encompassing rod 1 and connected to an energy source 8. Ends 3 and 4 of rod 1 are ground and polished in the form of curved focusing surfaces. Reflective layers 5 and 6 are deposited on ends 3 and 4, thereby forming an optical cavity resonator of the type described in U.S. Patent No. 3,055,257, issued Sept. 25, 1962. Alternatively, one of the layers, i.e., layer 5, may be eliminated; and an external concave reflector may be employed to complete the resonator and provide output coupling. To adapt the laser to oscillate, layer 6 is substantially totally reflecting while layer 5, or any substituted external reflector, includes at least a portion which is only partially reflecting to permit the abstraction of coherent radiation 7 having a wavelength in the optical range. To adapt the laser to amplify signals, layer 6 similarly is partially transmissive in order to admit an input signa beam; or the layers 5 and 6 are eliminated entirely. If desired, rod 1 during operation may be maintained in a bath of liquefied gas, such as nitrogen, to maintain a low temperature. Cooling of the crystal tends to enhance the quantum efficiency of production of the laser radiation.

The lamp 2 is advantageously of a type that produces intense radiation over a broad band extending from about 0.3 micron to longer wavelength. Mercury, xenon or tungsten lamps are considered useful to pump the materials of the invention, which are characterized by a plurality of sharp absorption lines and broad absorption bands in the specified range. In particular, it is characteristic of some of the materials of the present invention that both the energy-transferring or non-lasing transition element ions of the host compound and the lasing transition element ions participate in such absorption of the pumping light from lamp 2. Other types of lamps may, of course, be employed provided they emit sufficient energy at wavelengths corresponding to one or more useful absorption lines of the laser material. Is some cases it may be desirable to filter out pump light in certain wavelength regions.

Source 8 typically is an alternating-current source of known type and supplies sufficient power to lamp 2 for the desired amount of pumping light.

The principles of the invention can be explained as follows. In FIG. 2, the energy-state scheme for the active ion $Ni^{2+}$ is shown in the right hand portion of the diagram; and the energy-state scheme for the energy-transferring ion $Mn^{2+}$ is shown in the left-hand portion of the diagram. The nominal energy states characterizing the material are indicated by horizontal lines, but the "width" of these states are indicated qualitatively by the spectra drawn to one side of each portion of the diagram. The vertical scale represents energy measured in wave numbers; and the horizontal scale for the spectra represents the density of energy states, i.e., the strength of the line. These scales indicate relationships qualitatively and are not quantitatively accurate.

Pumping radiation from the lamp 2 excites electrons to upper states in both the $Mn^{2+}$ and $Ni^{2+}$ ions, as indicated by the vertical arrows pointing upward in FIG. 2. As taught in our above-cited copending application, the direct excitation of the nickel maintains a population inversion between the 6506 cm.$^{-1}$, or $^3T_2$, excited state of the nickel ion and the excited vibrational levels associated with the $^3A_2$ ground state of the nickel ion. A radiative transition can therefore be stimulated, i.e., by providing that the gain for the transition is above the oscillation level or by providing an input signal of appropriate frequency. The radiative transition, indicated by the crosshatched arrow pointed downward, may split the available energy with a phonon, indicated by the dotted arrow pointed downward, because the nickel ions readily couple energy to phonons, or lattice vibrations.

The terminal state of the laser transition is indicated by the horizontal dashed line in FIG. 2, even though this is a vibration level associated with the $^3A_2$ ground state of nickel in the crystalline lattice and is not an electronic level. It is characteristic of this type of transistion that a population inversion results as soon as any of the $^3T_2$ levels are excited, provided that the terminal state is associated with a phonon energy sufficiently greater than KT where K is Boltzman's constant and T is the absolute temperature. The laser therefore functions as one in which the terminal state is above the ground state.

In addition to the direct excitation, additional excitation of the nickel is produced by excitation of $Mn^{2+}$ levels and their associated vibrational bands that can couple energy to higher levels of the $Ni^{2+}$ ions. The energy transfer apparently occurs between respective levels of the $Mn^+$ and $Ni^{2+}$ that are separated in energy by less than about 1000 cm.$^{-1}$ (wave numbers). The energy transfer is indicated in FIG. 2 by the horizontal arrows. The upper nickel levels involved are apparently more easily excited by this transfer than by direct excitation. The relaxation of the higher excited states to the upper laser level typically occurs by indirect nonradiative processes, although these processes are indicated by the solid arrows pointed downward.

An important aspect of the invention which cannot be easily illustrated by FIG. 2 involves the mutual perturbations of energy states of transition element ions when they lie in sufficiently close proximity to one another. The transition elements are paramagnetic; and accordingly, atoms thereof lying sufficiently close together can perturb each other's energy states by exchange interactions. An exchange interaction is an inter-atomic interaction between electrons having magnetic moments, the interaction being describable as the exchange of these electrons between two or more separate atoms. Such exchange interactions are not strongly present among, for example, the nickel ions of the materials discolsed in our above-cited application because the nickel ions are present in rather weak uniformly distributed concentrations, as desired for laser action, and thus are too far apart. However, if a non-lasing transition element ion, i.e., another paramagnetic ion, is introduced in sufficient concentration into the host lattice, neighboring paramagnetic ions now have sufficient proximity to perturb the energy states of each other by exchange interactions.

We have found that a sufficient concentration of the non-lasing paramagnetic ions among the lasing ions to cause such perturbations also broadens the prominences of the phonon spectrum. It is noted that this interaction permits the material to be maintained at a low temperature in order to obtain maximum quantum efficiency while achieving the desired smoothed phonon spectrum.

Further, the advantages of our invention are not limited to a low-temperature environment, since the interactions of the different ions provide increased smoothness of the phonon spectrum at any temperature.

In general, the smoothed phonon-spectrum will appear in emission as illustrated in curve 20 at the righthand edge of the right-hand portion of FIG. 2. Accordingly, the gain-frequency profile for stimulated radiation is correspondingly smooth. As a consequence, the laser is adapted for smoother tunability of stimulated radiation. The smoothness of the phenon spectrum, as observed in emission, indicates that the terminal state of the stimulated radiation can be shifted at will without precipitous changes in the intensity of the stimulated radiation.

Our studies indicate that to obtain the tuning advantages of the present invention the non-lasing and lasing ions can be any pair selected from the transition element group consisting of titanium, vanadium, chromium, manganese, iron, cobalt, nickel and copper. Preferably, the lasing ion is divalent nickel or cobalt, or trivalent chromium. While charge compensation of trivalent lasing ions is preferred, it is not required. Of the monovalent ions that can be included in the active medium for charge compensation, lithium has an ionic radius that makes it most suitable when trivalent chromium is the lasing ion.

To obtain, in addition to an improvement in tunability, energy transfer from the non-lasing ion to the upper laser level of the lasing ion, the lowest excited level of the energy-transferring ion is preferably disposed above the upper laser level of the lasing ion; and at least one excited level of non-lasing ions is matched to a lasing ion excited level above the upper laser level. The energy transfer probably requires a matching level separation of less than one thousand wave numbers (1000 cm.$^{-1}$). To this end, for nickel or cobalt lasing ions, a desirable energy-transferring non-lasing ion is manganese. Moreover, the weakly absorbing manganese permits the pumping light to penetrate deeply and fairly uniformly into the crystal for all concentrations of the manganese compound. Such pumping light penetration is desirable for lasing action.

The useful ranges of concentration of the lasing and non-lasing ions for significant effects according to the present invention are as follows. For the case in which manganese provides the non-lasing ions and nickel provides the lasing ions, the compounds of the non-lasing ions comprise one mole percent to 99.9 mole percent of the active medium; and the compounds of the lasing ions comprise 0.1 mole percent to 5 mole percent of the active medium. For other combinations of the transition elements, the most significant change in these concentrations occurs in the upper limit for the compounds of the non-lasing ion, which should be reduced in direct relation to the increased strength of that ion in absorbing pumping radiation, as compared to manganese. For example, this concentration can be controlled by employing a non-paramagnetic host, such as $MgF_2$, $KMgF_3$, $NaMgF_3$, $ZnF_2$, $KZnF_3$ or $NaZnF_3$, as disclosed in our above-cited copending application, and replacing only a portion of the non-paramagnetic positive ions with transition element ions of the desired different types. Alternatively, the concentrations can be controlled by embedding the compounds of the different transition element ions in a glass. Still further, the concentration of non-lasing ions can be provided by two or more different transition elements.

Laser action has been observed in rutile-type crystalline lattices including a predominant concentration (99 mole percent) of $MnF_2$ which furnishes the energy-transferring divalent $Mn^{2+}$ ions, and a minority concentration (1 mole percent) of $NiF_2$ which furnishes divalent $Ni^{2+}$ active ions.

In such a laser crystal, phonon-terminated laser oscillation has been observed at about 1.9 microns at 77° K. The emission was found to be associated with a vibronic transition associated with the parent $^3T_2 \rightarrow {}^3A_2$ electronic transitions of the $Ni^{2+}$ ions.

Comparisons with the results obtained using the $MgF_2:NiF_2$ of our above-cited copending patent application indicate that the efficiency of the $MnF_2:NiF_2$ crystal just described benefitted from energy transfer from $Mn^{2+}$ to $Ni^{2+}$ resulting from absorption of pumping radiation in the two broad $Mn^{2+}$ absorption bands in the 4200–4600 angstrom unit and 4700–5500 angstrom unit ranges (i.e., 19,000 and 24,000 cm.$^{-1}$, respectively).

Moreover, the phonon-spectrum, as evidenced in the obtainable emission spectrum, was much smoother than heretofore obtained for $Ni^{2+}$ in $MgF_2$ at 77° K. The manganese-containing crystal is thus more suitable for broadband laser amplifiers or tunable solid state laser oscillators than any made heretofore.

Spectrographic studies upon a crystal including a predominant concentration (99 mole percent) of $KMnF_3$ in the perovskite crystalline form and a minority concentration (1 mole percent) of $KNiF_3$ have shown absorption and fluorescence in $Ni^{2+}$ that demonstrate this material is as well-suited for laser action as the preceding rutile-type material. In addition, the frequency band of the emitted radiation is further removed from the absorption band of water vapor at $1.9\mu$.

A specific mixed crystal of $MnF_2$ and $NiF_2$, from which laser action has been obtained as described above, was made as follows.

The starting material was high-purity (99.999%) manganese metal of a spongy texture, as is commercially available.

(1) The starting material was reacted with 48 percent aqueous HF mixed with, for example, 1 mole percent $NiF_2$ in a suitable container, e.g., a Teflon beaker. Although time is not critical, the process is preferably slow and may even take several days. The percentage of the aqueous hydrogen fluoride is also not critical; and the given $NiF_2$ concentration is typical but not necessarily the optimum concentration.

(2) The product was dried and subsequently melted in anhydrous HF in a platinum crucible.

(3) The melt was cooled rapidly in order to solidify with an approximately uniform concentration of $Ni^{2+}$ throughout the crystalline lattice. The product at this point is polycrystalline and needs to be made into a single crystal before being ground and polished as a laser crystal.

A modification of the Stockbarger-Bridgman technique was used to produce the single crystal. Although the procedure outlined by our co-inventor H. J. Guggenheim in the article "Growth of Highly Perfect Fluoride Single Crystals for Optical Masers," Journal of Applied Physics 44:2482 (August 1963) is suitable, the following procedure was found preferable.

(4) The product of step No. 3 above was placed in a carbon or platinum boat and is zone-melted at 1000° C. After one pass, there was approximately five times as much nickel in the "starting" end as in the "finish" end of the material, with a uniform concentration gradient therebetween.

(5) The boat was now turned around and zone-melted at 1000° C. in the opposite direction to re-establish a substantially uniform concentration of nickel throughout the ingot. We have found just two passes sufficient for obtaining a nearly perfect single crystal with a fairly uniform nickel concentration, as obtained at the end of the following cooling step. If desired, additional zone-melting can be used provided the steps No. 4 and No. 5 are repeated in sequence.

(6) The material was then cooled by slow movement, about one millimeter per hour through a temperature gradient of about 200° C. or more. If a higher temperature gradient is used, a more perfect liquid-solid interface can be obtained in the cooling process. Although slow movement is desired, the exact rate is not critical.

(7) The crystal was now ground and polished by known techniques to a form suitable for laser action. The polished crystal was one inch long, 0.150 inch in diameter. and had the form shown in FIG. 1.

In all cases, the above-described arrangements are illustrative of a small number of the many possible specific embodiments that can represent application of the principles of the invention. Numerous and varied other arrangements can readily be devised in accordance with these principles by those skilled in the art without departing from the spirit and scope of the invention. For example, other materials adapted to be employed according to the invention may include therein sodium, cesium or rubidium ions instead of potassium ions. Further, it is recognized that the crystalline lattices useful for the present invention are not limited to the rutile-type or perovskite-type crystalline lattices but also include a variety of other crystalline lattices, such as the cubic type, and also glasses as a non-crystalline host.

What is claimed is:

1. Apparatus adapted for the stimulated emission of radiation, comprising an active medium including two different ionic transition elements, one of said elements having associated therewith a pair of optically connected energy levels and the other of said elements having a concentration sufficient to perturb said energy levels through an exchange interaction, means for exciting the upper of said pair of levels, and means for abstracting an output from said apparatus.

2. Apparatus according to claim 1 in which the ionic transition elements have concentrations and absorption characteristics that permit energy from the exciting means to penetrate throughout the medium.

3. Apparatus adapted for the stimulated emission of radiation, comprising an active medium having a crystalline lattice including at least two different ionic transition elements, means for exciting said medium to enable said radiation, and means for abstracting an output from said apparatus, said elements providing mutual perturbation of the energy levels of one another to permit broadband phonon-terminated stimulated emission of said radiation from one of said elements.

4. Apparatus according to claim 3 in which the crystalline lattice is of a rutile form.

5. Apparatus according to claim 3 in which the crystalline lattice is of a perovskite form.

6. Apparatus adapted for the stimulated emission of radiation, comprising an active medium including different lasing and non-lasing paramagnetic elements, the non-lasing element being present in a concentration sufficiently great to perturb an optically connected pair of energy levels of the lasing element, the combined concentrations permitting pumping radiation to penetrate said material to populate the upper of said pair of levels, means for supplying said pumping radiation, and means for abstracting an output from said apparatus.

7. Apparatus according to claim 6 in which the paramagnetic elements are selected from the group consisting of titanium, vanadium, chromium, manganese, iron, cobalt, nickel and copper.

8. Apparatus according to claim 6 in which the non-lasing paramagnetic element is manganese and has greater concentration than the lasing element and the lasing paramagnetic element is nickel.

9. Apparatus according to claim 6 in which the non-lasing paramagnetic element has some of its excitable levels substantially matched to excitable levels of the other paramagnetic element that are above the upper level of the optically connected pair of levels thereof and has its lowest excitable energy levels above said pair of levels to promote a population inversion between the upper of said pair of levels and a vibrational level associated with said other element in said crystalline lattice.

10. Apparatus according to claim 9 in which the matched energy levels of the different paramagnetic elements are separated by less than 1000 wave numbers and the lasing paramagnetic element is selected from the group consisting of nickel, cobalt and chromium.

11. Apparatus adapted for the stimulated emission of radiation, comprising a mixed crystal of fluorides including manganese and nickel, the manganese having a greater concentration than the nickel in order predominantly to provide perturbations of the excitable energy levels of the nickel, whereby the phonon spectrum of nickel is made substantially smoother than in the absence of said perturbations, the combined concentrations of manganese and nickel allowing a pumping radiation to penetrate throughout said material, means for supplying said pumping radiation with appropriate frequencies and power to establish a population inversion between the upper level of an optically connected pair of energy levels in said nickel and a vibrational energy level associated with the lower level of said optically connected pair of energy levels, and means for abstracting an output from said apparatus.

12. Apparatus according to claim 11 in which nickel fluoride comprises from 0.1 mole percent to 5 mole percent of the mixed crystal and the manganese fluoride comprises from one mole percent to 99.9 mole percent of the mixed crystal.

13. Apparatus according to claim 11 in which the manganese is present as rutile-type manganese fluoride.

14. Apparatus according to claim 11 in which the manganese is present as a perovskite-type fluoride.

References Cited

Gandy et al., Radiationless Resonance Energy Transfer From $UO_2^2$ to $ND^{3+}$ in Coactivated Barium Crown Glass, App. Phys. Letters, vol. 4, No. 11 (June 1, 1964), pp. 188–190.

Murphy et al., Energy Transfer From 3d to 4f Electrons in $LaAlO_3$:Cr, Nd, Phys. Rev. Letters, vol. 13, No. 4 (July 27, 1964), pp. 135–137.

Kiss et al., Cross Pumped $Cr.^{3+}$–$Nd^{3+}$:YAG Laser System, vol. 5, No. 10 (Nov. 15, 1964), pp. 200–202.

JEWELL H. PEDERSEN, Primary Examiner

W. L. SIKES, Assistant Examiner

U.S. Cl. X.R.

252—301.2